Feb. 23, 1932.  B. J. YANCHENKO  1,847,058
GROUNDING CONNECTER
Filed July 12, 1928

INVENTOR
Basil J. Yanchenko
BY Bohleber + Ledbetter
ATTORNEYS

Patented Feb. 23, 1932

1,847,058

UNITED STATES PATENT OFFICE

BASIL J. YANCHENKO, OF NEW YORK, N. Y., ASSIGNOR TO THE THOMAS & BETTS CO., OF ELIZABETH, NEW JERSEY, A CORPORATION OF NEW JERSEY

GROUNDING CONNECTER

Application filed July 12, 1928. Serial No. 292,205.

This invention relates to electrical connecting means and more particularly to a grounding connecter to be used with wiring installations in buildings and the like, in order to ground the conduit wiring system and thereby reduce or eliminate fire hazards which may well result from arcing in the system.

An object of the invention is to produce a grounding connecter which is to be used with outlet boxes and conduit or cable installations to establish a positive electrical connection or bond between the outlet box and the conduit and also to produce a tight anchorage of the pipe within the knock-out hole of the box so that danger of any loosening of the pipe in the hole is eliminated.

A further object is to produce a ground connecter between the outlet box and the conduit or cable which can be installed either before or after the wires in the box are connected. For this reason the grounding device is so constructed that it may be inserted into position without removing the lock nut anchoring means which fastens the conduit in the box and also without disconnecting any of the wires which run through the pipe and which may have been connected. For this reason the grounding device can be used in old wiring systems to reestablish an electrical ground connection between the pipe and box in case such connection has become defective or insufficient and thereby insuring a properly grounded system without the inconvenience of disconnecting any wires and therefore permitting the installation of the connecter in a minimum amount of time.

The accompanying drawings illustrate an example of the invention which show the principle involved and wherein:

Figures 1, 2, 3 and 4 show respectively a front view, a sectional view of Figure 1 on the line 2—2, a side view and a sectional view on the line 4—4 of Figure 1 of my split ring grounding connecter.

Figure 1:
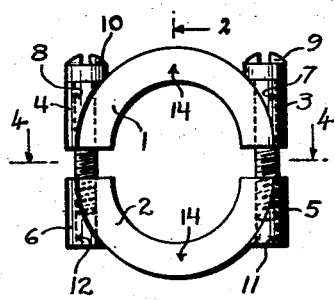
Figure 2:
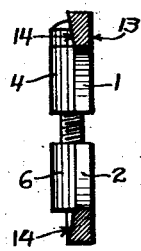
Figure 3:
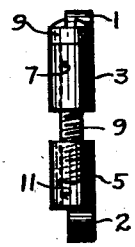
Figure 5:
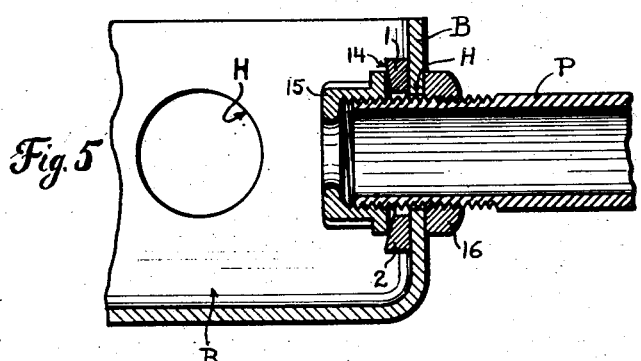
Figure 5 shows a box assembly view in longitudinal section with the grounding connecter tightened into final position between the box wall and pipe-anchorage lock nut.
Figure 4:
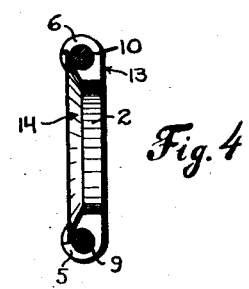
Figure 6:
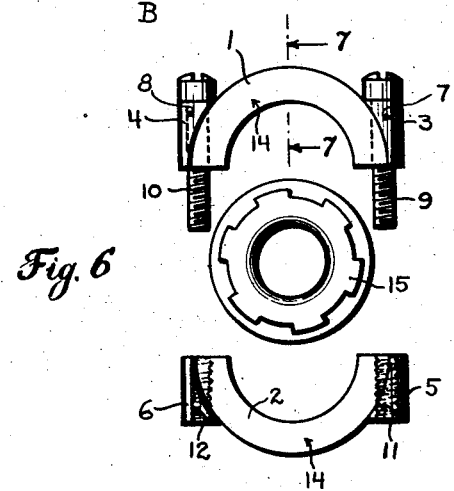
Figure 6 shows the grounding connecter and a conduit and lock nut with the connecter parts in spaced relation to show the manner in which the device is assembled.
Figure 7:
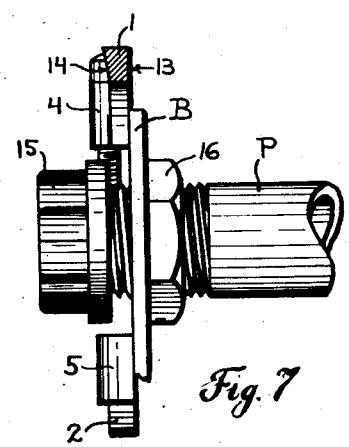
Figure 7 is a side view of Figure 6 partly in section.

In house and building electrical wiring work, an outlet box B with conduit or cable knock-out openings H is ordinarily used into which the wires are frequently led through a conduit or pipe P. The pipe P is secured in the customary opening H of the box by any suitable anchorage means as for example by a lock nut 16 and bushing nut 15. Aging and deterioration of parts as by rust and corrosion often causes looseness of the pipe in the box. Therefore a good electrical ground connection no longer exists between the pipe and box and hence sparks or even an electrical arc may result at the box assembly. My grounding connecter installed in a new box assembly prevents the development of looseness because extraordinary tightness is secured in the first or original assembly and when used in an old box assembly it removes looseness and reconditions the old work.

In my invention I provide a wedge shaped means which is forcibly inserted between the bushing 15 and the box wall B and thereby removes any looseness which may exist between the pipe lock nuts 15 and 16 and box wall B. Where lock nuts 15 and 16 alone are relied upon to secure a tight anchorage of the pipe P in a box B, it is more or less difficult for the workmen on the job to sufficiently tighten the pipe nuts so that all lost motion between these parts and the box may be positively taken up and a tight connection established. The difficulty is due primarily to the fact that the space within which the workmen must work with his tools in tightening up the conduit lock nuts is limited and also there is much probability that the box would be broken from its support on the lath or wall of the building if it is subjected to excessive nut tightening. With my invention these various difficulties and objections are removed and a tight and secure connection is made which furthermore establishes a good electrical bond and ground connection between the pipe P and box B.

One example of my invention is shown and described herein but it is understood that the device may be varied in form without departing from the invention. The grounding connecter consists essentially of a split ring forming two half sections 1 and 2 which are provided respectively with two pair of lugs 3 and 4, 5 and 6 integral at the ends of each half of the ring sections. The lugs 3 and 4 have holes 7 and 8 to loosely permit clamping screws 9 and 10 to be inserted therein. The lugs 5 and 6 of the other half of the ring have screw threaded holes 11 and 12 adapted to receive the screws 9 and 10 and thereby draw the two halves of the ring together.

The split ring 1—2 has a flat face 13 which slides against the wall of the outlet box B and the other face 14 is conical or at an angle to the axis of the ring 1—2 thereby producing a wedge-shaped formation on each segmental ring section. This conic face is adapted to engage the nut 15 of the connection as the two halves of the ring are drawn together by means of any suitable operating means such as the screws 9 and 10. One or both parts 1 and 2 may be made in segmental form.

The grounding connecter is installed and functions in a manner now to be described. If the connecter is to be used on old wiring installations it may be necessary to loosen the nut 15 somewhat in order to enable the narrow inner edge of the ring to be freely inserted between the nut and the box wall. The two sections of the ring are then placed around the conduit pipe P so that the flat face of the sections are against the box wall. The screws 9 and 10 are then inserted through the free holes 7 and 8 provided therefor in one of the sections and screwed into the threaded holes 11 and 12 in the other section. The screws 9 and 10 or other operating means are then tightened which draws the two sections 1 and 2 together until the conic or wedging faces 14 engages the face of the nut 15. Continued tightening of the screws will wedge the sections between the box and face of the nut 15, thereby securing a rigid and tight connection and establishing a positive electrical ground of connection between the box and pipe anchorage nuts.

It is apparent from the manner in which my device is used and the manner in which it is inserted that it is very well adapted for both old wiring work, in which the wires are electrically connected, without disturbing any of the wire connections excepting the unloosening of the conduit nut sufficiently to receive the inner edge of the ring 1—2. The device is equally well adapted for new housework wiring installations in which case the wire connections may be entirely completed or not whichever is most convenient. If the wire connections have not been made the connecter may be loosely assembled and placed over the pipe and against the box wall and the lock nut then screwed on or it may be inserted between the box wall and lock nut in the manner above described. It is immaterial as far as the effectiveness of the connecter is concerned whether it is old or new wiring installations with which my device is to be used and if the installation is new it is immaterial whether the wiring connections have been completed or not. In other words the grounding connecter is adapted to suit any condition confronting a workman on a wiring job, old or new.

Although one example of the structure illustrates the principles involved in my invention it is to be understood that the construction may be varied without departing from the invention. For example, the segmental sections 1 and 2 may be provided with one or two screw-carrying lugs and the lugs may or may not form part of the wedging means. The grounding connecter may also be constructed so that a single screw will force the two sections 1 and 2 together. One or both sections 1 and 2 may be segmentally shaped, and the wedging face 14 may be formed on either or both of the ring sections. A portion or the entire surface 14 may be wedge shaped.

It will be observed from the above description of the manner in which my grounding connecter is operated that the wedge-shaped segments, as they are drawn together by the operating means, will produce a scraping action between the flat faces 13 of the sectional ring 1—2 and box wall and also between the conic face 14 and the nut 15. This scraping action insures a positive and tight clamping action as well as a positive and effective electrical connection and ground because it tends to scrape away any insulating materials and dirt which frequently adhere between the parts. This results in a perfect electrical bond between the conduit P and the box B. The connecter is moreover easily applied and requires tightening of the screws only, rather than tightening of the conduit nut located in a space which is inadequate to secure a proper tightening thereof.

It is apparent that both segmental wedge parts 1 and 2 exert a longitudinal force on the pipe P tending to pull the pipe into the box B thereby jamming the lock nut 16 against the outside surface of the box. The pull on the pipe is straight and hence it is an advantage to make both of segmental members 1 and 2 wedge shaped so that the force on the pipe is a straight one.

It is advisable to tighten the bushing nut 15 by hand until the nut 15 engages the wedge-faced segmental connecter which is in open position as in Figure 1. Thereafter the operating screws are tightened which draws the two wedge members 1 and 2 toward each other and in between the box wall and nut 15 to effect a positive electrical ground between all parts as well as a secure physical joinder of the conduit P to the box B.

The pipe nuts 15 and 16 may simply be termed lock nuts and constitute screw-operated anchorage means to secure the pipe P in the box. Likewise the screws 9 and 10 constitute screw-operating means to draw together the wedging segments. It is clear therefore that the two screw-operating means cooperated with each other to effect an electrical ground connection and physically tight and rigid pipe and box connection.

One or both of the segmental grounding parts, say the member 1, includes an internal arched or ring-like seat to fit upon or around the pipe P. The other member 2 is oppositely disposed so that, upon turning the screws, the first named member is drawn toward the pipe and toward the latter named member with the result that a wedging action of equal force on both sides of the pipe is introduced between the pipe nut anchorage means 15 and the box wall B.

The connecter device is unusually easy to mount in position because the half section or portion 2 can first be placed in position on the pipe behind the nut 15 through the top and open end of the box and then rotated half way around to the bottom portion of the box to make room for the other half-ring part 1, whereupon the screws 9 and 10 are inserted and tightened up.

What I claim is:

1. A grounding connecter and conduit tightened for a conduit and outlet box assembly having screw operated anchorage means to fasten the conduit in the box comprising, a pair of members disposed between the box wall and one of the screw anchorage means and on opposite sides of the conduit, operating means to enforce movement of the members transversely of the conduit and towards each other, and means on each of said members to frictionally bear against the box wall and anchorage means with increasing pressure as the movement of the members continue.

2. A grounding connecter and conduit tightener for a conduit and outlet box assembly having screw operated anchorage means to fasten the conduit in the box comprising, a pair of members disposed between the box wall and one of the screw anchorage means and on opposite sides of the conduit, operative means to enforce movement of the members transversely of the conduit and towards each other, and a wedge upon one of said pair of members to frictionally bear against the box wall and anchorage means with increasing pressure as the movement of the members continue.

3. A grounding connecter and conduit tightener for a conduit and outlet box assembly having screw operated anchorage means to fasten the conduit in the box comprising, a pair of wedges disposed between the box wall and one of the screw anchorage means and upon opposite sides of the conduit and operating means to draw the wedges together transversely of the conduit and towards each other to frictionally bear against the box wall and the anchorage means.

4. A grounding connecter and conduit tightener for a conduit and outlet box assembly having screw operated anchorage means to fasten the conduit in the box comprising, a ring formed of two semi-circular sections to be disposed on opposite sides of the conduit and between an anchorage means and the box wall, operating means to retain the sections in assembled relation and draw them together, and means upon said sections to frictionally bear against the box wall and the anchorage means with increasing pressure as the movement of the sections continue.

5. A grounding connecter and conduit tightener for a conduit and outlet box assembly having screw operated anchorage means to fasten the conduit in the box comprising, a ring formed of two semi-circular sections to be disposed upon opposite sides of the conduit and between the anchorage means and the box wall, operating means to retain the sections in assembled relation and draw them together, and wedges upon said sections to frictionally bear against the box wall and the anchorage means with increasing pressure as the movement of the sections continue.

6. A grounding connecter and conduit tightener for a conduit and outlet box assembly having screw operated anchorage means to fasten the conduit in the box comprising, a ring formed of two semi-circular sections to be disposed upon opposite sides of the conduit and between the anchorage means and the box wall, a conic surface on one face of said ring, operating means to retain the sections in assembled relation and draw them together to frictionally bear the sections against the box wall and the anchorage means with increasing pressure as the movement of the sections continue.

7. A grounding connecter and conduit tightener for a conduit and outlet box assembly having screw operated anchorage means to fasten the conduit in the box comprising, a ring formed of two semi-circular sections to be disposed upon opposite sides of the conduit and between the anchorage means and the box wall, a conic surface on one face of said ring, a pair of screws passing loosely through the ends of one section and threaded into the other section to retain the sections in assembled relation and draw them together to frictionally bear against the box wall and the anchorage means with increasing pressure as the movement of the sections continue.

8. A grounding connecter and conduit tightener for a conduit and outlet box assembly having screw operated anchorage means to fasten the conduit in the box comprising, a pair of members disposed between the box wall and one of the screw anchorage means, operating means to enforce movement of the members transversely of the conduit and towards each other, and means on one of said members to frictionally bear against the box wall and anchorage means with increasing pressure as the movement of the members continue.

9. A grounding connecter and conduit tightener for a conduit and outlet box assembly having conduit anchorage means comprising a segmental member having a ring-like seat to fit a pipe and including wedging means to be forceably inserted between the box wall and the pipe anchorage means, another member adapted to be disposed oppositely the segmental member and on the other side of the pipe, and screw means cooperating with the two members to move the segmental member and wedging means toward the pipe.

10. A grounding connecter comprising two cooperating members, both of which are provided with an internal ring-like pipe seat adapted to embrace a pipe, and both of which have a flat face to engage a box wall, and both of which have a wedge-shaped face to engage a pipe anchorage means to apply force thereto; and screw means engaging the ends of the members to draw them together to force the wedge-shaped faces to slide against the pipe anchorage means.

In testimony whereof I affix my signature.

BASIL J. YANCHENKO.